United States Patent
Weddingfeld et al.

(10) Patent No.: US 8,572,305 B2
(45) Date of Patent: Oct. 29, 2013

(54) APPARATUS AND METHOD FOR CONFIGURING A BUS SYSTEM

(75) Inventors: Klaus Weddingfeld, Waldkirch (DE); Markus Rose, Freiburg (DE)

(73) Assignee: Sick AG, Waldkirch/Breisgau (DE)

( * ) Notice: Subject to any disclaimer, the term of this patent is extended or adjusted under 35 U.S.C. 154(b) by 303 days.

(21) Appl. No.: 13/072,876

(22) Filed: Mar. 28, 2011

(65) Prior Publication Data
US 2011/0238876 A1  Sep. 29, 2011

(30) Foreign Application Priority Data
Mar. 29, 2010 (EP) .................................. 10003394

(51) Int. Cl.
*G06F 13/00* (2006.01)
*G06F 3/00* (2006.01)

(52) U.S. Cl.
USPC ........ 710/110; 710/8; 710/9; 710/14; 710/104

(58) Field of Classification Search
USPC .................................. 710/8, 9, 14, 104, 110
See application file for complete search history.

(56) References Cited

U.S. PATENT DOCUMENTS

| | | | | |
|---|---|---|---|---|
| 6,611,722 | B2* | 8/2003 | Behr et al. | 700/3 |
| 6,676,831 | B2* | 1/2004 | Wolfe | 210/85 |
| 7,076,311 | B2* | 7/2006 | Schuster | 700/21 |
| 7,188,062 | B1* | 3/2007 | Rieschl et al. | 703/23 |
| 7,369,902 | B2* | 5/2008 | Nakayama et al. | 700/3 |
| 7,948,391 | B2* | 5/2011 | Pullmann et al. | 340/679 |
| 2003/0023901 | A1* | 1/2003 | Hack et al. | 714/25 |
| 2004/0008467 | A1* | 1/2004 | Calandre et al. | 361/119 |
| 2004/0210323 | A1* | 10/2004 | Muneta et al. | 700/21 |
| 2004/0210620 | A1* | 10/2004 | Muneta et al. | 709/200 |
| 2005/0071022 | A1* | 3/2005 | Izzo et al. | 700/79 |
| 2005/0091410 | A1* | 4/2005 | Gibart et al. | 709/248 |
| 2005/0234567 | A1 | 10/2005 | Dold et al. | |
| 2007/0285950 | A1* | 12/2007 | Nakamura et al. | 363/1 |

(Continued)

FOREIGN PATENT DOCUMENTS

DE  199 39 567 A1  3/2001
DE  10 2004 018 642 A1  12/2005

(Continued)

OTHER PUBLICATIONS

Bai Zhanyuan; Aidong Xu; Liu Mingzhe; Song Yan, "A novel comparator with hamming code correction for Safety Programmable Logic Controller," Computational Problem-Solving (ICCP), 2010 International Conference on , pp. 410,412, Dec. 3-5, 2010.*

(Continued)

*Primary Examiner* — Faisal M Zaman
(74) *Attorney, Agent, or Firm* — Nath, Goldberg & Meyer; Jerald L. Meyer; Scott C. Langford (57) ABSTRACT

The present invention relates to an apparatus for configuring a bus system which includes a plurality of participants as well as a bus master and a safety monitor having an input unit by means of which suitable configuration information can be entered and/or selected for the configuration of the bus system and having a configuration unit configured to configure both the bus master and also the safety monitor by means of at least a piece of identical common configuration information input or selected via the input unit. The invention further relates to a method which can be carried out by the apparatus in accordance with the invention.

11 Claims, 3 Drawing Sheets

10 bus system
12 participant
14 bus line
16 bus master
18 safety monitor
20 PLC
22 microprocessor
24 safety switch
26 configuration apparatus
28 input unit
30 computer mouse
32 configuration unit
34 interface
36 memory unit
38 display unit

(56) References Cited

U.S. PATENT DOCUMENTS

| | | | |
|---|---|---|---|
| 2007/0288674 A1* | 12/2007 | Ikeno | 710/110 |
| 2008/0010638 A1* | 1/2008 | Klopfer et al. | 717/168 |
| 2009/0002135 A1* | 1/2009 | Dold et al. | 340/10.51 |
| 2009/0024230 A1* | 1/2009 | Hioka et al. | 700/17 |
| 2009/0030534 A1* | 1/2009 | Dold et al. | 700/83 |
| 2009/0043939 A1* | 2/2009 | Fuessl et al. | 710/305 |
| 2009/0171472 A1* | 7/2009 | Teranisi et al. | 700/3 |
| 2009/0222107 A1* | 9/2009 | Moddemann et al. | 700/21 |
| 2010/0019921 A1* | 1/2010 | Kreiner et al. | 340/825.22 |
| 2010/0235682 A1* | 9/2010 | Yoshida et al. | 714/25 |
| 2011/0093096 A1* | 4/2011 | Sachs et al. | 700/81 |
| 2011/0098830 A1* | 4/2011 | Weddingfeld et al. | 700/79 |
| 2011/0264266 A1* | 10/2011 | Kock | 700/253 |

FOREIGN PATENT DOCUMENTS

| | | | |
|---|---|---|---|
| DE | 10 2008 004 798 A1 | | 7/2009 |
| DE | 10 2008 045 590 B3 | | 1/2010 |
| EP | 276937 A1 | * | 8/1988 |
| EP | 1170645 A2 | * | 1/2002 |
| EP | 1 353 246 A2 | | 10/2003 |
| EP | 1 455 251 A1 | | 9/2004 |
| EP | 1 362 269 B1 | | 2/2005 |
| JP | 2005107898 A | * | 4/2005 |
| JP | 2010055652 A | * | 3/2010 |
| JP | 2011186528 A | * | 9/2011 |
| WO | WO 2010063319 A1 | * | 6/2010 |
| WO | WO 2010121797 A1 | * | 10/2010 |

OTHER PUBLICATIONS

Karmakar, G.; Kabra, A.; Patil, R.K.; Ramamritham, K., "Partitioned environment for Programmable Controller in safety applications," Emerging Technologies & Factory Automation (ETFA), 2012 IEEE 17th Conference on , pp. 1,4, Sep. 17-21, 2012.*

Dongfeng Yue; Dong Yu; Tianrong Gao; Yi Hu, "Intelligent controller architecture for safety systems in automatic industry," Intelligent Control and Automation (WCICA), 2010 8th World Congress on , pp. 2186,2191, Jul. 7-9, 2010.*

Ji-Young Kim; Dong-Young Lee; Joon Lyou, "Reliability Analysis of Safety Grade Programmable Logic Controller," SICE-ICASE, 2006. International Joint Conference , pp. 4345,4349, Oct. 18-21, 2006.*

Extended European Search Report issued on May 21, 2010, in corresponding European Patent Application No. 10 003 394.3.

Third Party Observation for Application No. EP20100003394, received Jun. 12, 2013 from the European Patent Office.

Brochure "Safety PLC Pluto With dynamics, the new safety principle" 2008 (Debra GmbH/Jokab Safety).

PLUTO Safety PLC Programming Manual 2008 (Jokab Safety).

Manual DP/AS-i F-Link VI.0 (issue Oct. 2006) with Supplements (Edition Apr. 2011) Oct. 2006 (Siemens AG).

Internet publication Delivery release DP/AS-i F-Link Sep. 2, 2007 (Siemens AG).

Internet publication for Entry-ID: 24196041 May 26, 2011 (Siemens AG).

* cited by examiner

Fig. 1

10 bus system
12 participant
14 bus line
16 bus master
18 safety monitor
20 PLC
22 microprocessor
24 safety switch
26 configuration apparatus
28 input unit
30 computer mouse
32 configuration unit
34 interface
36 memory unit
38 display unit

Fig. 2

40 participant type
44 bus address
46 element type
48 drag and drop operation

Fig. 3

40 participant type
44 bus address
46 element type
50 drag and drop operation

Fig. 4

40 participant type
44 bus address
46 element type

Fig. 5

52 input evaluation
54 logic pre-evaluation
56 logic evaluation

APPARATUS AND METHOD FOR CONFIGURING A BUS SYSTEM

The present invention relates to an apparatus and to a method for configuring a bus system which includes a plurality of participants as well as a bus master and a safety monitor, in particular a field bus system.

For controlling of industrial processes bus systems working as a master slave and in particular field bus systems are being used in an increasing manner. Sensors and/or actuators can be the participants of such bus systems, which are also referred to as slaves, by means of which processes are monitored and controlled. A bus master hereby controls the communication of the participants via the bus.

The bus master of the bus system is configured to control the communication between the participants via the bus, in that it cyclically queries the participants which is also referred to as polling, and registers the responses of the participants to the cyclic queries. Each participant at a specific bus address, which is associated with the participant, is queried by the bus master. In an exemplary bus system, which corresponds to the standard "actuator/sensor interface" or ("AS-interface" or "AS-i"), for example, 31 different bus addresses are available for 61 different participants. In addition to the control of the communication the bus master also takes over different diagnostic tasks and maintenance tasks at the bus.

When a piece of safety-relevant information should be transferred to or from safety-related participants in such bus systems, for example, pieces of information of safety-related sensors which should protect a dangerous process zone and should cause a switch-off, for example of a press, when a person enters the safety region, a secure transfer and evaluation of the piece of information in the bus system must be ensured.

To satisfy the specified safety standards a safety monitor is provided for such bus systems for the communication with the safety-directed participants as an additional communication component which safety monitor listens to the messages transferred at the bus and securely evaluates the pieces of safety-relevant information. The safety monitor can in this respect include a logic evaluation of the pieces of safety-relevant information, as well as an output at which, in the case of danger, a safety-related cutoff of a process is caused in dependence on the logic evaluation. In principle the bus system can include both safety-related participants and also non-safety-related participants.

Depending on the specific field of application and the properties of the monitored and/or controlled process, the number and the type of participants which communicate in a specific bus system with a corresponding control via the bus is variable. In the delivery state the bus master and the safety monitor for this reason respectively do not know how many participants are present and/or how many participants should be connected to the bus, and/or which types of participants are present and at which bus addresses these should communicate with the respective participants.

So that the bus master and the safety monitor can satisfy their functions in a specific system, this means so that the bus master can control the communication of the slaves at the bus and the safety monitor can read out the pieces of safety-relevant information and securely evaluate these the bus master and the safety monitor must be configured in accordance with the specific system prior to the commissioning of the bus system. This means that the pieces of configuration information relating to the participants provided in the specific bus system must be gathered and the workflows in the bus master and the safety monitor must be matched to the respective constellation of participants in a corresponding configuration process.

For example, for an AS-i bus system both the bus master and also the safety monitor must be configured, for example, in dependence on how many and/or which bus addresses are occupied with participants and with what type of bus participants the addresses are occupied.

An AS-i bus system is described, for example, in DE 10 2008 045 590 B3, where modules are provided which are both components of the master and also of the safety monitor and which are commonly used by the master and by the safety monitor.

For known methods and apparatuses for configuring a bus system as is described above, the pieces of configuration information required for configuring the bus system must be input into an input unit by a user, following which the bus master is configured with the pieces of input configuration information by means of a configuration unit coupled to the input unit.

Furthermore, the piece of configuration information required for the configuration of the safety monitor must be separately input by a user in an input unit, whereby the safety monitor is configured by these pieces of configuration information by means of the configuration unit.

The known methods and apparatuses for configuring a bus system as is described above therefore require a high configuration effort and cost for the user and cause a high susceptibility to errors for the configuration. For example, it can happen that the bus master and the safety monitor do not function correctly following the configuration, for example because a user has input a piece of conflicting information about the participants present at the bus for the configuration of the bus master, on the one hand, and the configuration of the safety monitor, on the other hand, so that bus master and safety monitor are not configured on the basis of the same configuration and thus cannot cooperate in the desired manner.

The invention is based on the object of providing an apparatus and a method, in which the effort and the cost required for configuring a bus system with a plurality of participants, as well as a bus master and a safety monitor is considerably reduced and which reliably ensures an error-free configuration of the bus system.

To satisfy this object, an apparatus for configuring a bus system which includes a plurality of participants as well as a bus master and a safety monitor having an input unit by means of which suitable configuration information can be entered and/or selected for the configuration of the bus system and having a configuration unit which is configured to configure both the bus master and also the safety monitor by means of at least a piece of identical common configuration information input or selected via the input unit is provided. The apparatus includes an input unit by means of which a piece of suitable configuration information can be entered and/or selected for the configuration of the bus system and having a configuration unit which is configured to configure both the bus master and also the safety monitor by means of at least an identical piece of common configuration information input or selected via the input unit.

When the "input" of pieces of configuration information is described in this text, also the selection of an already stored piece of configuration information can specifically be meant also when this is not explicitly mentioned as an input alternative.

In accordance with the invention a piece of information on the participants of the bus system which is necessary both for the configuration of the bus master and also for the configuration of the safety monitor (such a double-use of a piece of configuration information is also referred to as "a piece of common configuration information" in the following), i.e. is only recorded by a one-time input and then this same piece of common configuration information is used both for the configuration of the bus master and also for the configuration of the safety monitor.

Through this, it is achieved that such a piece of common configuration information only has to be input once by a user and for this reason a consistent and less error-prone configuration of both the bus master and also the safety monitor occurs. In this manner, the effort and cost required for the configuration by a user which arises due to the requirement of a two-time input of a piece of configuration information required for the configuration of bus master and safety monitor is also avoided. At the same time the danger of an inconsistent or incorrect configuration of the safety monitor and of the bus master is prevented by an arbitrary input of a piece of conflicting configuration information for the bus master, on the one hand, and the safety monitor, on the other hand, are avoided.

The apparatus in accordance with the invention thus reduces the effort and cost required for the configuration of the bus system and at the same time increases the error-safety of the configuration. In the ideal case the at least one piece of common configuration includes all pieces of configuration information relating to the participants which represents both the piece of configuration information required for the configuration of the bus master and also for the safety monitor.

Advantageous embodiments of the invention are described in the subordinate claims, the description and the Figures.

The at least one piece of common configuration information input or selected via the input unit and used for the configuration of both the bus master and the safety monitor can, for example, includes a piece of address information which states how a specific bus address is to be configured for the communication with which participant of the bus system.

In the simplest case, the piece of address information can include a statement that a participant, which is associated with a bus address, is actually present at the specific bus address and/or which addresses are associated with a participant at the bus and which are not. In dependence on such a piece of address information the bus master can be configured by the configuration unit to direct a query at the respective address, to expect and/or to register an answer of the participant at the respective address or not, in the scope of the cyclic polling. Also the safety monitor can be configured with reference to such a piece of address information, to monitor the communication at the bus for answers of participants at each address and to process the answer or not.

Additionally to pieces of information about the pure presence and/or association of a participant to an specific bus address, the at least one piece of common configuration information can include a piece of information on an essential property of a participant associated with a specific bus address for the configuration of the bus master and the safety monitor. The piece of common configuration information can, for example, include a piece of safety information which states whether a participate associated with a specific bus address is a safety-directed participant or a non-safety-directed participant.

Both safety-related participants and also non-safety-related participants can be present in the bus system. The safety-related participants of the bus system are in this respect preferably sensors whose output signals deliver pieces of safety-relevant information or actuators who receive safety-related command signals from the bus. For this purpose they are, for example, configured as multi-channel. Alternatively—should the sensors and/or the actuators themselves not be bus-capable—a bus interface suitable for the incorporation of such a sensor or actuator is correspondingly configured as a safety-directed participant.

The safety-directed participants of the bus system are in this respect preferably configured to enable a transfer of signals via the bus with an increased safety level in comparison to the non-safety-related participants. For an AS-i bus system, for example, a secure transfer of the signals from the safety-directed participants via the bus is ensured via dynamic code tables. Hereby the safety-directed participant transmits a code, readout from a known code table in the participant, which is compared to a code stored in a code table present in the safety monitor, to recognize in which of the channels of the safety-directed participant are, wherein the code transmitted by the safety directed participant varies in accordance with the dynamic code table between different query cycles. Hereby an increased error safety of the transfer on the bus for the safety-related participants is ensured as systematic transfer errors can be excluded.

By means of the pieces of safety information which state whether a respective participant associated with a bus address is a safety-directed participant or a non-safety-directed participant, the safety monitor can be configured to only evaluate the answers transmitted from the safety-directed participant in a secure manner. The safety monitor can further be configured to only carry out a predefined teach-in function with the safety-directed participants by means of which the previously described dynamic code tables are exchanged between the respective participants and the safety monitor, to respectively be available there for the subsequent operation.

The bus master can be configured with the pieces of safety information, to suitably evaluate the answers transmitted from the safety-directed participant or, possibly, to only pre-process the answers transmitted from the non-safety-directed participants for a subsequent logic processing, as the safety-directed participants are preferably evaluated in the safety monitor.

The at least one piece of common configuration information can also include a piece of input information/a piece of output information which states how many inputs and/or outputs a participant associated with a specific bus address has.

The number of inputs and outputs of the participant provides a piece of information on how the transmitted answers from the participants are to be interpreted. For this reason, both the bus master and also the safety monitor can be configured by means of the piece of input information/piece of output information, to correctly pre-evaluate an answer transmitted by a participant associated with a specific bus address for a subsequent logical evaluation.

The piece of common configuration information can also be a piece of information on which bus profile is sufficient for a participant allocated to a specific bus address, for example, which device profile is in accordance with the AS-i standard. Such a bus profile as a rule includes a piece of information on the meaning of the piece of information which is transferred with the answer of a participant, and also, for example, whether specific methods are supported for an exchange of pieces of information or not.

In accordance with an advantageous embodiment the apparatus includes a memory unit with a plurality of participant descriptions of different participant types, wherein the participant descriptions include pieces of configuration information relevant for the respective participant type and the input unit is configured such that the input of the pieces of configuration information includes the selection of a participant type with the participant description associated therewith and the association of the participant type and the participant description with a specific bus address.

Pieces of configuration information relevant to a specific participant type are thus already stored in the memory unit of the apparatus so that during the configuration by a user only the respective participant type with its associated participant description must be selected to provide all pieces of configuration information stored in the participant description for the subsequent configuration. Through this, the configuration effort and cost can be further reduced and the error-safety of the configuration can be further improved, in that only the correct type has to be selected and the remaining pieces of configuration information is automatically loaded from the participant description.

The participant description of a participant type can, in particular, include one or more of the aforementioned pieces of the common configuration information described above. The participant description can in this respect include one or more pieces of common configuration information by means of which the configuration unit, as well as the bus master and also the safety monitor can be configured, but additionally also such pieces of configuration information by means of which the configuration unit only configures one of the two components bus master and safety monitor and which otherwise do not represent a piece of common configuration information.

A particularly simple and error-free selection of the participant types and the associated participant descriptions is enabled when the apparatus includes a display unit which is configured to display graphical representations of the individual participant types in a first display region and to display graphical representations of the individual bus addresses in a second display region.

The apparatus can then be configured to allow a user an association of a participant type to a bus address by means of a drag and drop functionality between the graphical representation of the participants types and the graphical representations of the bus addresses.

Through such a drag and drop functionality a particularly clear comprehensible association of a participant type to a bus address can occur for the user. For the provision of the drag and drop functionality the apparatus includes at least one suitable input device coupled to the display unit, such as, for example, a computer mouse. Following an association of a participant type to a bus address the graphical representation of the bus address is preferably changed such that the association of the participant type with the bus address is recognizable. In this way it is easily recognizable for the user that the address has already been assigned to a participant so that the user can easily recognize, on the distribution of the participants in his planed bus system, which bus addresses are already occupied and which are still free.

To prevent an accidental double association of a plurality of participant types to a bus address, a drag and drop functionality at a bus address which is already associated with a participant can be deactivated for so long until a participant type already associated with a bus address is possibly removed again by the user through a corresponding input.

As was already mentioned, at least one participant of the bus system can be a bus interface. Such a bus interface serves for the connection of a sensor or an actuator which itself does not include an interface for the connection to the bus system and which is connectable to the bus via a bus interface. For safety-directed sensors or actuators and, in particular for two-channel sensors or actuators a corresponding safety-directed bus interface with corresponding inputs for the individual channels and a corresponding ability for secure communication at the bus can be provided while for non-safety-directed sensors and actuators a non-safety-directed bus interface is usable.

A bus interface as described above has one or more inputs and/or one or more outputs for the connection of the connections of the respective sensors or actuators. The configuration of the safety monitor can not only depend on the properties of the bus interface, but at the same time also depends on the properties of a safety-directed sensor connected at the inputs of the bus interface and/or possibly on the safety-directed actuator connected at the output of the bus interface, in particular, on the use of safety-directed bus interfaces.

The piece of configuration information required for the safety monitor can thus also include a piece of information on a safety-directed sensor connected to a safety-directed bus interface.

This piece of configuration information can, in particular relate to the configuration of the logic pre-evaluation carried out by the safety monitor on the data received from the safety-directed participants. For example on use of a two-hand control as a safety-directed sensor a synchronization of the states of both of the switches of the two-hand control in a specific time interval of, for example, 0.5 seconds is typically required so that one can assume a secure state and that no safety cutoff is carried out. The logic pre-evaluation of the safety monitor is in this case to be configured such that the safety monitor which is connected to the two-hand control via the bus interface pre-evaluates received pieces of information on the state of the first and second switch of the two-hand control such that only on satisfying this synchronization requirement a secure state is forwarded to the logic evaluation following the logic pre-evaluation and otherwise not. For this reason, the logic pre-evaluation of the safety monitor must be configured with corresponding pieces of information on the required logic pre-evaluation.

To simplify the input of such a piece of information on the required logic pre-evaluation of the participants and/or the bus interfaces, the memory unit preferably includes a series of element descriptions of different sensor types or actuator types, wherein the element descriptions include pieces of relevant configuration information for those sensor types or actuator types which themselves are not bus-capable and/or have to be connected via a bus interface. The input of the pieces of configuration information can then include the selection of an element type with its associated element description and the association of the element type to an already selected bus interface associated with a bus address. In this respect it is preferred when a bus interface, associated with an address, is displayed in the graphical representation of this bus address and a drag and drop functionality between a graphical representation of the element types and the graphical representation of the bus address and/or the bus interface associated with the bus address is provided.

Besides the previously described apparatus also a method for configuring a bus system which includes a plurality of participants as well as a bus master and a safety monitor is an aspect of the invention. The method for configuring a bus system which includes a plurality of participants as well as a bus master and a safety monitor includes the following steps:
    input or selection of pieces of configuration information suitable for the configuration of the bus system and
    configuration of both the bus master and also the safety monitor by means of at least one identical input or selected piece of common configuration information.

In this respect the method can, in particular be carried out on the intended use of the apparatus described above. The embodiments and advantages described above with regard to the apparatus are correspondingly also applicable to the method in accordance with the invention.

For example the at least one piece of common configuration information can include a piece of safety information which states whether a participant associated with a specific bus address is a safety-directed participant or a non-safety-directed participant.

In the context of the method, a plurality of participant descriptions of different participant types can be stored, wherein the participant description for the respective participant includes pieces of relevant configuration information and includes the input or the selection of the piece of configuration information, the selection of a participant type with the participant description associated therewith. The selection of a participant type with the participant description associated therewith and the association thereof to a specific bus address can in this respect be enabled, in particular through the provision of a drag and drop functionality as described above.

A further aspect of the invention is a computer program which is designed to configure a computer such, that an above-described method can be carried out by the computer.

Finally, an electronic data carrier and/or an electronic storage medium is a further aspect of the invention which can both independently be configured to cooperate with a computer such that the computer can be configured such that a method described above can be carried out by a computer.

In the following the present invention will be described in an exemplary manner with reference to an advantageous embodiment and with regard to the submitted Figures. There is shown.

Initially, the bus system illustrated in FIG. 1, as well its functionality in the configured state will be described in detail in the following. Subsequently the apparatus for the configuration of the illustrated bus system and the configuration thereof will be discussed.

Figure 1:
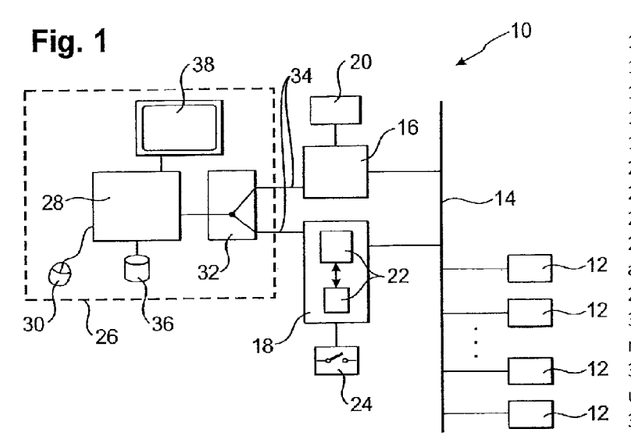
FIG. 1 a schematic view of a bus system having a configuration apparatus in accordance with the invention connected at the bus system.

FIG. 1 shows a serial bus system 10, in the specific embodiment shows an AS-i bus system 10 having a plurality of participants 12 which are connected at a bus line 14 of the bus system 10, as well as a bus master 16 connected to a bus line 14 and a safety monitor 18. The bus master 16 is configured to control the communication at the bus 14. For this purpose the bus master 16 directs cyclic queries at the individual participants 12 ("polling") via the bus addresses respectively associated with the participants 12 during operation of the bus system 10. The respectively queried participant 12 then transmits an answer via the bus 14 to inform on its state. In the present bus system 10 safety-directed participants 12 and non-safety-directed participants 12 are present, however, in principal also only safety-directed participants 12 can be present.

The bus master 16 is configured to receive the answers transmitted by the participants 12 and to evaluate these normally, i.e. to evaluate these as non-safe. The bus master 16 can, for example, forward the received piece of information to a programmable logic controller (PLC) 20 which undertakes a logic evaluation of the signals and possibly generates a corresponding control signal. Such control signals can be retransmitted back to the bus master 16 and from there be transmitted back to an actuator configured as the bus participant 12 via the bus 14.

The safety monitor 18 is configured to listen to messages transmitted between the bus master 16 and the participants 12 via the bus 14 and, in particular to listen to the answers to the queries transmitted by the participants 12 to the bus master 16 and to securely evaluate these. A secure evaluation of the signals received by the safety monitor 18 in the present embodiment occurs in a two-channel structure of the safety monitor 18 by means of two redundant micro-processes 22 which mutually monitor each other as is illustrated by the double arrow in FIG. 1.

The safety monitor 18 not only carries out a secure evaluation of the pieces of safety-relevant information transmitted by the safety-directed participant 12 via the bus, but at the same time also ensures a secure transfer of the data transmitted from safety-directed participants 12 via the bus 14. The safety-directed participants 12 of the bus system 10 are in this respect configured to transmit a code from a code table in dependence on its respective state in each query cycle, wherein the transmitted code changes between the different cycles. The safety monitor 18 is configured to compare the data transmitted by the safety-directed participant 12 to a corresponding code table stored in the safety monitor 18, to derive from this the state of the corresponding safety-directed participant 12 and, in particular in the case of a deviation, to conclude a non-safe state of a channel of the participant 12.

Through the use of the dynamic code table for the communication between the safety-directed participants 12 and the safety monitor 18 systematic transfer errors can be excluded and thus a safe communication is enabled. The required exchange of the dynamic code table between the safety-directed participants 12 and the safety monitor 18 before operation in this respect occurs in the scope of a teach-in-function, which can be carried by the safety monitor 18 following the configuration of the bus system 10.

To satisfy the corresponding safety standards, all participants 12 in the bus system 10 which deliver the pieces of safety-relevant information are configured as safety-directed participants 12 to communicate securely with the safety monitor 18. Despite of this the safety monitor 18 can also process data from non-safety-directed participants 12 besides processing the data from safety-directed participants 12 when this is required by the specific application.

Through the previously described evaluation of the signals transmitted by the safety-directed participants 12 by means of the dynamic code table which evaluation is also referred to as an input evaluation, the safety monitor 18 can detect in which state a safety-directed participant 12 is, wherein transfer errors can be excluded to a high degree of safety. Like the safety monitor 18, also the safety-directed participants 12 are configured multi-channeled to ensure the required safety, wherein the pieces of information on the safety-directed participants 12 determined by the safety monitor 18 include a piece of information on the state of the individual channels of the safety-directed participant 12.

Following the previously described input evaluation by means of the dynamic code tables, the safety monitor carries out a logic pre-evaluation of the received data, in which the safety monitor 18 logically links the obtained pieces of information on the states of the individual channels of a safety-directed participant 12 to derive a distinct piece of information on whether the respective safety-directed participant 12 is in a secure state or in a non-secure state.

For a two-hand control, two channels can for example, correspond to the states of the two switching elements of the two-hand control. For such a two-hand control, one can only consider the safe state when the starting states of the switches are synchronized to one another in time. In dependence on the required safety level, it can, for example, be required that the two switches are synchronized to a timely tolerance of 0.5 seconds or shorter. The logic pre-evaluation in the safety monitor 18 can then generate an individual signal which states whether the two-hand control is in a safe state or not in accordance with these specifications from the derived states of the individual channels of the two-hand control by means of an AND link having a corresponding time delay element. This signal can then be used in a logic evaluation following the logic pre-evaluation.

The safety monitor 18 or possibly also a correspondingly coupled separate logic control can then generate control signals with the safety monitor 18 during the logic evaluation, to enable a safety cutoff in dependence on the states of the safety-directed participant 12. For this reason, the safety monitor 18, as is shown in FIG. 1, can be connected to a safety switch 24 via a separate output which receives a control signal in dependence on the logic evaluation carried out in the safety monitor 18 which control signal can be transferred and evaluated in a two-channel manner.

Instead of a separate connection to a safety switch 24, also a feed-back of control signals to the bus master 16 and from there to the bus 14 and to the participants 12 can be provided by the safety monitor 18.

So that the bus master 16 and the safety monitor 18 can carry out the aforementioned functions during the operation of the bus system 10, the bus master 16 and the safety monitor 18 must be configured with pieces of configuration information corresponding to the participants 12, to thereby correspondingly match the work processes in the bus master 16 and the safety monitor 18 to the provided participants 12.

For this reason, a configuration apparatus 26 is provided, such as the one shown in FIG. 1. The apparatus 26 includes an input unit 28 by means of which suitable pieces of configuration information can be entered and/or selected for the configuration of the bus system 10. For this purpose the input unit 28 includes a computer mouse 30. The apparatus 26 also includes a configuration unit 32 which is configured to configure both the bus master 16 and also the safety monitor 18 by means of at least one identical piece of common configuration information input and/or selected by means of the input unit 28. The configuration unit 32 is in this respect configured to doubly use pieces of common configuration information input and/or selected via the input unit, namely once to configure the bus master 16 and once to configure the safety monitor 18.

For this reason the configuration unit 32 is provided in the present example with two interfaces 34 for the connection of the bus master 16 and the safety monitor 18. In principle bus master 16 and safety monitor 18 can simultaneously be configured with the pieces of common configuration information, however, also with a timely displacement, in which case the safety monitor 18 and the bus master 16 can also be connected at the same interface 34 of the configuration unit 32 at subsequent times for a separate configuration.

The configuration of the bus master 16 and the safety monitor 18 can in principle occur prior to the startup of the bus system 10 and, in particular also occur prior to the construction of the bus system 10, this means before the safety monitor 18 and bus master 16 are connected at the bus line 14 and/or before one or more of the participants 12 are connected to the bus line 14. Also the configuration can, however, occur, as is shown in FIG. 1 for a constructed bus system 10.

The configuration apparatus 26 includes a digital memory unit 36 in which a plurality of participant descriptions of different participant types are stored, wherein the participant descriptions include pieces of relevant configuration information for each participant type. A participant type having the associated participant description is selectable via the input unit 28 for a user for the input of pieces of configuration information and can be associated with a bus address selected by a user.

The association of a participant type having the associated participant description is enabled for the user via a drag and drop functionality between a graphical representation of the participant type and a graphical representation of the bus address, wherein the graphical representation and the drag and drop functionality can be presented by a display apparatus 38 in the form of a display or a monitor which is coupled to the input unit 28.

The function of the configuration apparatus 26 and, in particular, the input unit 28 will be described in the following with reference to FIGS. 2 to 4 by means of a graphical user interface displayed at the display unit 38 of FIG. 1.

At the graphical user interface the graphical representations 40 of three different participant types are present, wherein each graphical representation of a participant type is associated with the corresponding participant descriptions of the participant type. The graphical representations 40 respectively include a designation of the respective type, in this case the designations T1, T2 and T3, as well as a symbol-like illustration of a participant of the corresponding type, as well as a statement on the AS-i device profile, which corresponds to the respective participant, in the present case the AS-i device profile S-O.B.E for the respective participant types T1 and T2. The participant type T1 shall be a bus interface, the participant type T2 shall be a light grid and the participant type T3 shall, for example, be an AS-i-capable standard sensor. The participant types T1 and T2 are thus safety-directed participants while the participant T3 is a standard-AS-i-participant.

The graphical user interface further includes a graphical representation 44 having a designation A1 to A31 for each address available at the bus system, in the present case the typically available addresses 1 to 31 for an AS-i-bus system. Furthermore, the graphical representations 46 of element types are illustrated which will still be referred to in detail with reference to FIGS. 3 and 4.

Figure 2:
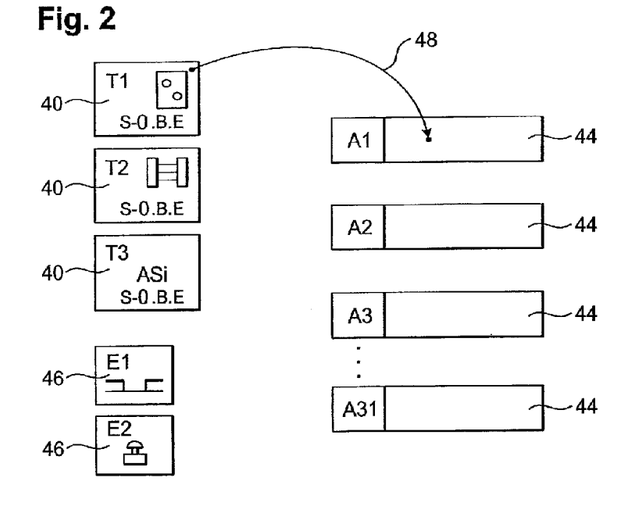
FIG. 2 a schematic view of a graphic user interface for the input and/or the selection of pieces of configuration information.

A drag and drop functionality is present between the graphical representations 40 of the participant types T1, T2 and T3 and the graphical representations 44 the bus addresses 1 to 31 so that, as indicated by the arrow 48 in FIG. 2, a participant type T1 with its associated participant description can be allocated a specific address by a user, for example the address 1. Through such an allocation the user, on the one hand, inputs the piece of information that a participant is associated with the address A1 and simultaneously allocates the pieces of configuration information stored in the participant description of the participant type T1 to the address which pieces of configuration information are then available for the subsequent configuration of the participant associated at the address A1 in the bus master and/or in the safety monitor.

The participant description in this respect includes both a piece of information on whether the participant type is a safety-directed or a non-safety-directed participant type, as well as a piece of information on the number of inputs and/or outputs of the participant and on the AS-i-device profile which satisfies the participant type.

Figure 3:
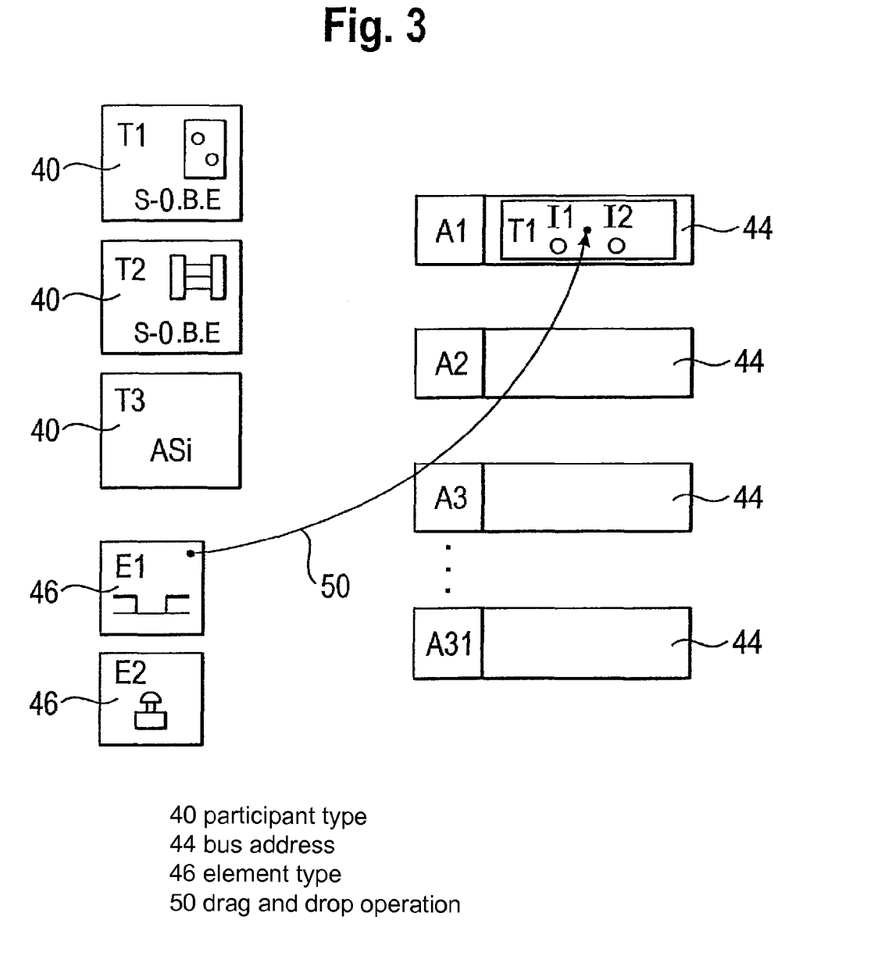
FIG. 3 the graphical user interface of FIG. 2 following the input of pieces of configuration information.

FIG. 3 shows the graphical user interface following the association of the address 1 with the participant type T1 by means of the drag and drop, as is indicated by the arrow 48 in FIG. 2. As shown in FIG. 3, the graphical representation 44 of address 1 is correspondingly changed so that for the user the allocation of the address A1 to the participant T1 carried out is recognizable.

The participant type T1 is a bus interface having two inputs I1 and I2 at which a corresponding safety-directed sensor can be connected which per se is non-bus-capable sensor which should be connected to the bus system via the bus interface.

The participant description of participant type T1 includes a corresponding piece of information on the presence of the two inputs I1 and I2 and on their properties. In the graphical representation 44 of address 1 not only the designation of the participant type T1 is displayed, but also the two inputs I1 and I2 of the participant type T1. A further drag and drop functionality is now present between the graphical representation 44 of address 1 and the graphical representation 46 of the element types E1 and E2 by means of which element types E1, E2 can be associated to the address 1 in addition to the participant type T1. In the present example, an association of the element type E1, which describes a safety-directed two-channeled two-hand control, is indicated by the arrow 50 to the user for address 1 by means of drag and drop.

Through this association the user states that a secure two-hand control of type E1 is connected to the bus interface of type T1 and/or should be connected thereto which in the present example would not be bus-capable without the bus interface. The drag and drop functionality between the graphical representation 46 of the element types and the addresses 44 can be configured such that on carrying out the drag and drop it is monitored whether a participant type is associated with the address which participant type is suitable for the connection of the corresponding element, for example whether the participant type has the suitable number and types of inputs and/or outputs.

By means of the drag and drop the element type cannot only be associated to an address and/or a participant type allocated to the address, but the precise selection of the final position of the drag and drop within the graphical representation 44 of the bus address A1 can also be selected for which inputs of the participant type T1 allocated to the bus address A1 should be used for the connection of the element E1. In the present embodiment the bus participant T1 only has two inputs which are both required by the two channels of the two-hand control E1 so that a selection of specific inputs by the user is not required.

Figure 4:
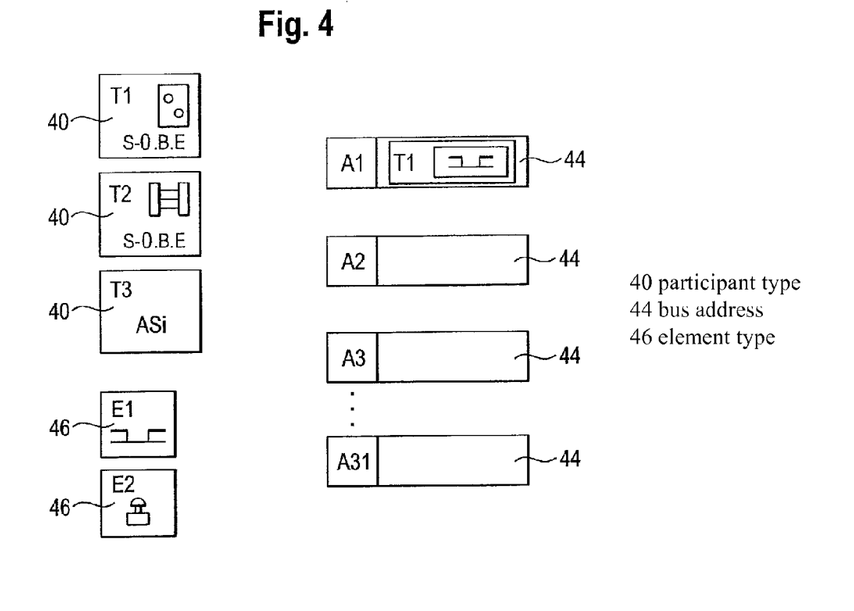
FIG. 4 the graphical user interface of FIG. 3 following an input of further pieces of configuration information.

FIG. 4 shows the graphical user interface following the association of the element types E1 to address 1 and/or of the participant types T1 associated with the address by the user, by means of the arrow 50 indicating the drag and drop in FIG. 3.

Once the user has allocated an address for all participants provided in the bus system in the manner described above and possibly has additional associated element types to the addresses and/or to the participants, the apparatus has all of the pieces of configuration information required for the configuration of the bus master and the safety monitor including a piece of information on which address is associated with a participant, whether a participant associated with an address is a safety-directed participant or a non-safety-directed participant, how many inputs and/or outputs the participant has and which AS-i-device profile the participant corresponds to. This piece of information can be used by the configuration unit as a piece of common configuration information both for the configuration of the bus master and also for the configuration of the safety monitor. Thus, only the one-time input of the required pieces of configuration information is required by the user, whereby the configuration effort and cost is reduced for the user. Furthermore, through the graphical representation of the configuration process a particularly simple, quick and error-free configuration is enabled.

Beside the pieces of common configuration information which can be used both for the configuration of the bus master and also of the safety monitor, at the same time still such pieces of configuration information included in the participant descriptions can, for example, be delivered which are possibly only required for the configuration of the safety monitor and/or for the configuration of the bus master.

In this respect, in particular pieces of configuration information for the safety monitor can be included in the element description of the element types E1 and/or E2 which pieces of configuration information relate to the logic pre-evaluations of the elements and/or their bus interfaces. In the present case the element description E1, which describes the secure two-hand control, includes a piece of information on whether the states of the two switches of the two-hand control which are transferred by different channels have to be synchronized to a timely tolerance of, for example, 0.5 seconds or a different value input, in particular by a user so that one can assume a safe state.

Figure 5:
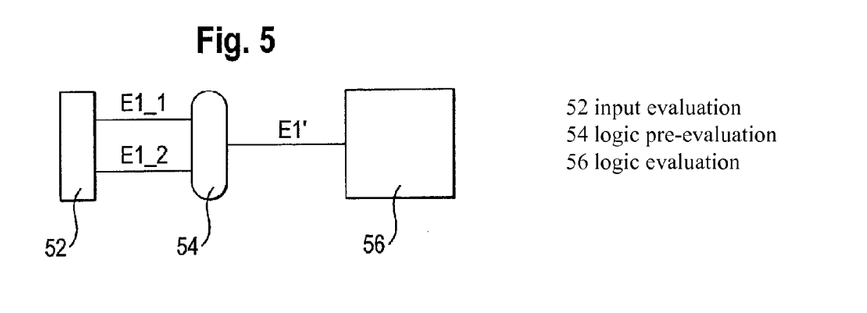
FIG. 5 a schematic illustration of an initial evaluation and a logic evaluation carried out by the safety monitor.

As is indicated in the diagram of FIG. 5, the safety monitor can be configured by means of these pieces of information to describe the signals E1_1 and E1_2, which respectively describe the state of a channel of the two hand control, following an input evaluation 52 by a corresponding logic pre-evaluation 54 to suitably evaluate these in accordance with the previously mentioned specifications, to provide a pre-evaluated signal E1' which delivers a distinctive statement on whether the state of the two-hand control is secure or not. This signal E1' can then be provided to the programming logic evaluation 56 of the safety monitor still to be programmed by the user.

List Of Reference Numerals 10 bus system
12 participant
14 bus line
16 bus master
18 safety monitor
20 programmable logic controller, PLC
22 microprocessor
24 safety switch
26 configuration apparatus
28 input unit
30 computer mouse
32 configuration unit
34 interface
36 memory unit
38 display unit
40 graphical representation of a participant type
44 graphical representation of a bus address
46 graphical representation of an element type
48, 50 drag and drop operation
52 input evaluation
54 logic pre-evaluation
56 logic evaluation

The invention claimed is:

1. An apparatus (26) for configuring a bus system (10), comprising:
a plurality of participants (12) connected at a bus (14);
a bus master (16) configuring to control communication at the bus line (14) by directing cyclic queries at the plurality of participants (12) via bus addresses respectively associated with each of the plurality of participants (12), during operation of the bus system (10);
a safety monitor (18) configured to listen to messages transmitted between the bus master (16) and each of the plurality of participants (12) via the bus line (14), and to securely evaluate these messages;
an input unit (28) by means of which suitable configuration information can be, input or selected for the configuration of the bus system (10); and
a configuration unit (26) configured to configure both the bus master (16) and the safety monitor (18) by means of at least one piece of common configuration information identical to the suitable configuration information input or selected via the input unit (28),
wherein the at least one piece of common configuration information includes a piece of address information which states how a specific bus address is to be configured for communication with the respectively associated participant (12) of the bus system (10).

2. An apparatus in accordance with claim 1, wherein the at least one common piece of configuration information includes a piece of safety information which states whether a participant (12) associated with a specific bus address is a safety directed participant (12) or a non-safety directed participant (12).

3. An apparatus in accordance with claim 1, wherein the at least one piece of common configuration information includes a piece of input information/output information which states how many inputs and/or outputs a participant (12) associated with a specific bus address has.

4. An apparatus in accordance with claim 1, wherein the apparatus has a memory unit (36) with a plurality of participant descriptions of different participant types, wherein the participant descriptions include a piece of relevant configuration information for the respective participant type and the input unit (28) is configured such that the input or the selection of the piece of configuration information includes the selection of a participant type with the participant description associated therewith.

5. An apparatus in accordance with claim 4, wherein the apparatus includes a display unit (38) which is configured to display graphical representations (40) of the individual participant types in a first display region and to display graphical representations (44) of bus addresses in a second display region.

6. An apparatus in accordance with claim 5, wherein the apparatus is configured to allow a user an association of a participant type to a bus address by a user by means of a drag-and-drop functionality between the graphical representation (40) of the participant types and the graphical representation (44) of the bus addresses, preferably such that following the association of a participant type to a bus address the graphical representation (44) of the bus address is changed such that the association of the participant type to the bus address is recognizable.

7. An apparatus in accordance with claim 1, wherein at least one participant (12) of the bus system (10) includes a bus interface.

8. A method for configuring a bus system (10), the bus system (10) comprising:
a plurality of participants (12) connected at a bus line (14);
a bus master (16) configured to control communication at the bus line (14) by directing cyclic queries at the plurality of participants (12) via bus addresses respectively associated with each of the plurality of participants (12), during operation of the bus system (10); and
a safety monitor (18) configured to listen to messages transmitted between the bus master (16) and each of the plurality of participants (12) via the bus line (14), and to securely evaluate these messages,
the method for configuring the bus system comprising:
inputting or selecting at least one piece of configuration information for the configuration of the bus system (10) via an input unit (28), and
configuring the bus master 16 and the safety monitor (18) by means of at least one piece of common configuration information identical to at least one piece of suitable configuration information input or selected via the input unit (28), using a configuration unit (26),
wherein the at least one piece of common configuration information includes a piece of safety information which states whether a participant (12) associated with a specific bus address is a safety related participant (12) or a non-safety related participant (12).

9. A method in accordance with claim 8, wherein a plurality of participant descriptions of different participant types are stored, wherein the participant descriptions include a piece of relevant configuration information for the respective participant types, and
the input or selection of the piece of configuration information includes the selection of a participant type with the participant description associated therewith.

10. A computer program product stored on a non-transitory computer readable medium which when executed causes a computer system to perform a method for configuring a bus system (10), the bus system (10) comprising:
a plurality of participants (12) connected at a bus line (14);
a bus master (16) configured to control communication at the bus line (14) by directing cyclic queries at the plurality of participants (12) via bus addresses respectively associated with each of the plurality of participants (12) during operation of the bus system (10); and
a safety monitor (18) configured to listen to messages transmitted between the bus master (16) and each of the plurality of participants (12) via the bus (14) and to securely evaluate these messages,
the method for configuring the bus system (10) comprising:
inputting or selecting at least one piece of suitable configuration information for the configuration of the bus system (10) via an input unit (28), and
configuring the bus master (16) and the safety monitor (18) by means of at least one piece of common configuring information identical to the at least one piece of suitable configuration information input or selected via the input unit (28), using a configuration unit (26),
wherein the at least one piece of common configuration information includes a piece of safety information which states whether a specific participant (12) associated with a specific bus address is a safety related participant (12) or a non-safety related participant (12).

11. A non-transitory computer readable electronic storage medium configured to cooperate with a computer to perform a method for configuring a bus system (10), the bus system (10) comprising:

a plurality of participants (12) connected at a bus line (14);
a bus master (16) configured to control communication at the bus line (14) by directing cyclic queries at the participants (12) via bus addresses respectively associated with each of the plurality of participants (12) during operation of the bus system (10); and
a safety monitor (18) configured to listen to messages transmitted between the bus master (16) and each of the participants (12) via the bus line (14) and to securely evaluate these messages, the method for configuring the bus system (10) comprising:
   inputting or selecting at least one piece of suitable configuration information for the configuration of the bus system (10) via an input unit (28), and
   configuring the bus master (16) and the safety monitor (18) by means of at least one piece of common configuration information identical to the at least one piece of suitable configuration information input or selected via the input unit (28) using a configuration unit (26),
   wherein the at least one piece of common configuration information includes a piece of safety information which states whether a participant (12) associated with a specific bus address is a safety related participant (12) or a non-safety related participant (12).

\* \* \* \* \*

UNITED STATES PATENT AND TRADEMARK OFFICE
CERTIFICATE OF CORRECTION

PATENT NO. : 8,572,305 B2
APPLICATION NO. : 13/072876
DATED : October 29, 2013
INVENTOR(S) : Klaus Weddingfeld and Markus Rose It is certified that error appears in the above-identified patent and that said Letters Patent is hereby corrected as shown below:

In the Claims

- Claim 1, Column 13, Line 5, after "(16)", and before "to"

replace "configuring" with "configured"

- Claim 8, Column 14, Line 12, after "of", and before "configuration"

add "suitable"

- Claim 10, Column 14, Lines 53-54, after "common", and before "information"

replace "configuring" with "configuration"

Signed and Sealed this
Seventh Day of January, 2014

Margaret A. Focarino
*Commissioner for Patents of the United States Patent and Trademark Office*